Aug. 7, 1923.
G. A. TRACHTE ET AL
1,464,018
CORRUGATING MACHINE
Filed Sept. 8, 1920
4 Sheets-Sheet 1
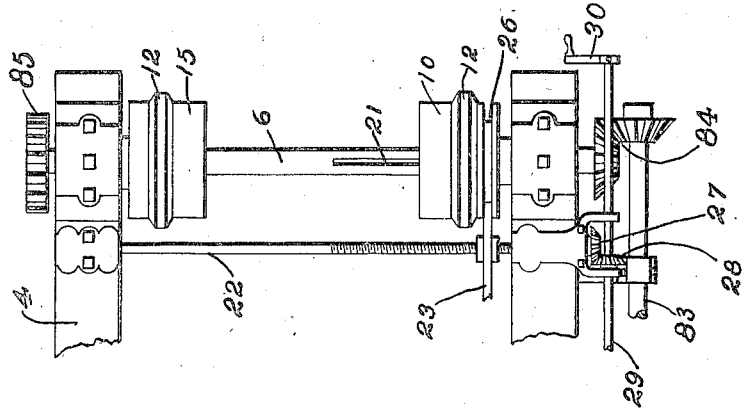
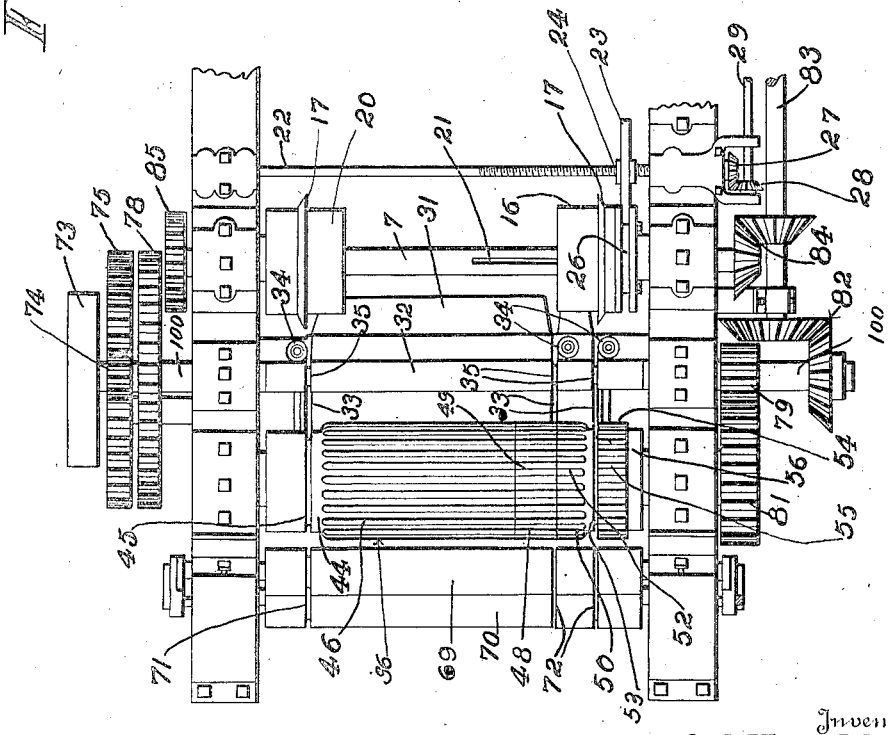
Fig. 1.
Inventors
G. A. Trachte and
A. F. Trachte.
By C. A. Snow & Co.
Attorney Aug. 7, 1923.
G. A. TRACHTE ET AL
1,464,018
CORRUGATING MACHINE
Filed Sept. 8, 1920
4 Sheets-Sheet 2
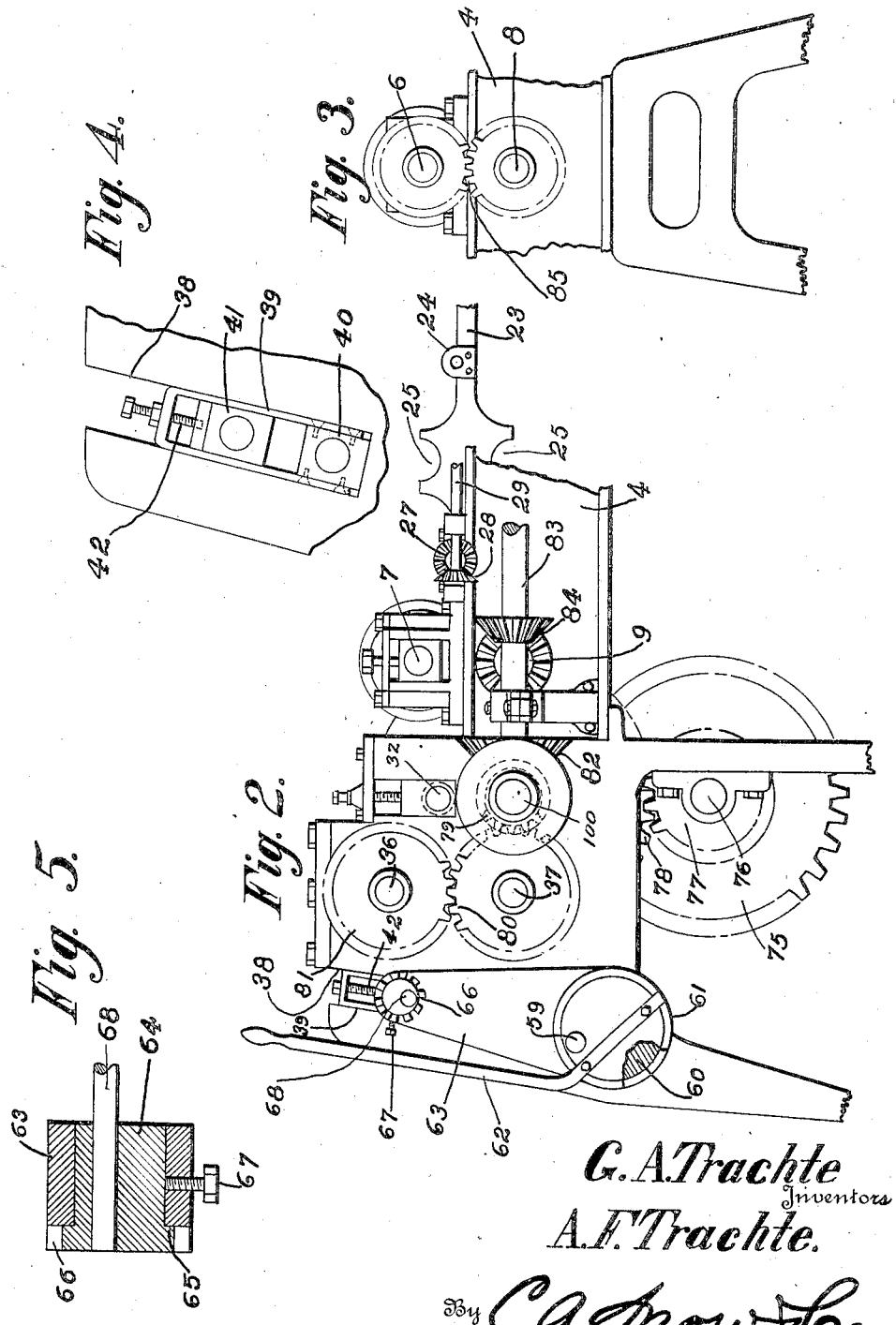
G. A. Trachte
A. F. Trachte
Inventors
By C. A. Snow & Co.
Attorney

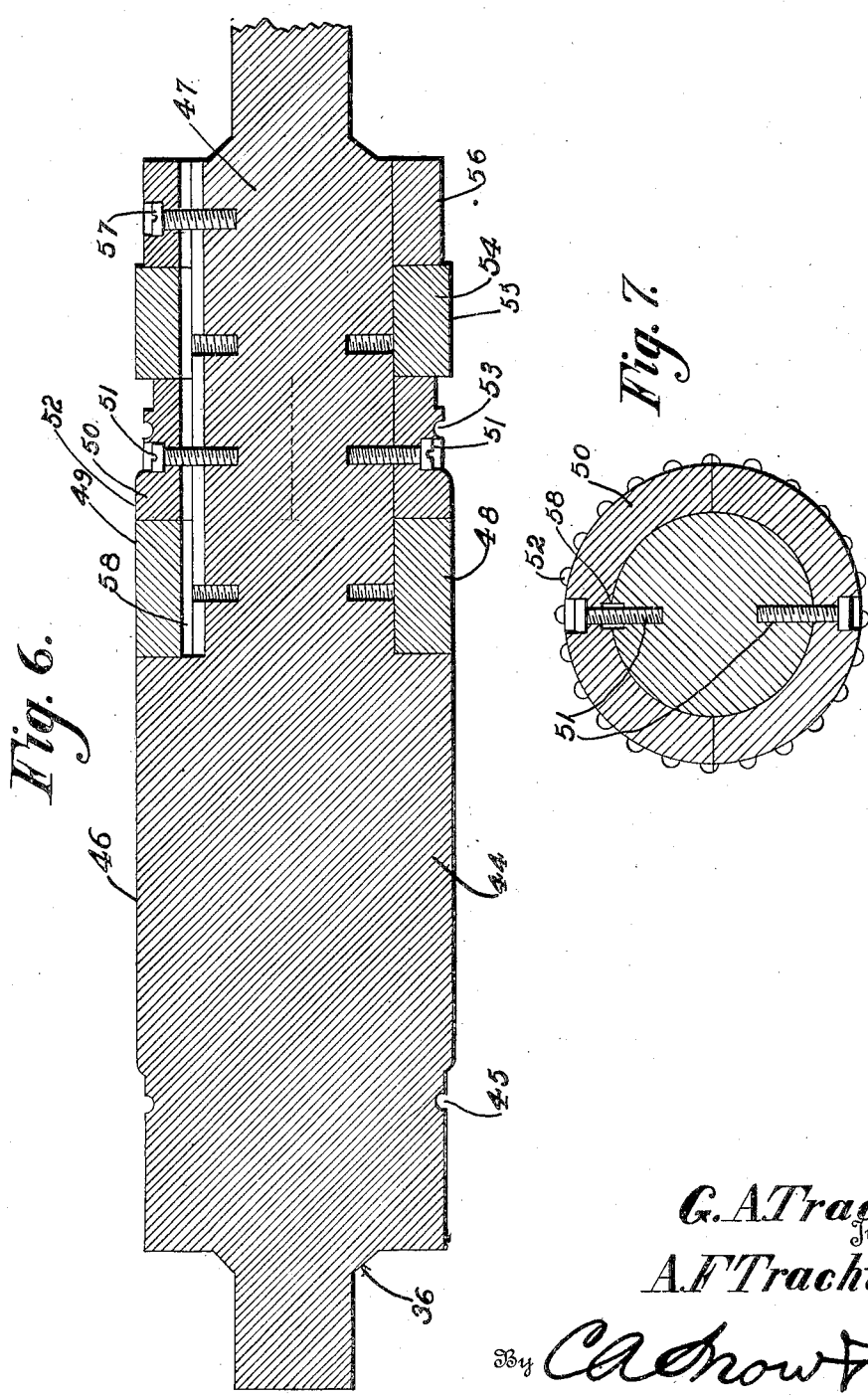

Aug. 7, 1923.

G. A. TRACHTE ET AL 1,464,018

CORRUGATING MACHINE

Filed Sept. 8, 1920

4 Sheets-Sheet 4

G. A. Trachte.
A. F. Trachte.
Inventors

By C. A. Snow & Co.
Attorneys

Patented Aug. 7, 1923.

1,464,018

UNITED STATES PATENT OFFICE.

GEORGE A. TRACHTE AND ARTHUR F. TRACHTE, OF MADISON, WISCONSIN.

CORRUGATING MACHINE.

Application filed September 8, 1920. Serial No. 408,839.

*To all whom it may concern:*

Be it known that we, GEORGE A. TRACHTE and ARTHUR F. TRACHTE, citizens of the United States, residing at Madison, in the county of Dane, State of Wisconsin, have invented a new and useful Corrugating Machine, of which the following is a specification.

Figure 8:
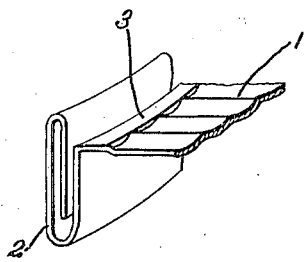

Noting Figure 8 of the drawings of this application, it may be stated that it is common to fashion the side wall of a can or other receptacle, from a piece of metal, the side wall being provided at its ends with reversely turned beads which receive the ends of the can or receptacle, the body of the can being longitudinally corrugated, and there being a plane surface between the corrugations and the beads. A machine for making an element of the sort above alluded to, is shown in our prior Patent No. 1,189,885, granted on the 4th day of July, 1916.

In the making of the article above alluded to, a strip of metal is subjected to the action of a series of rollers which, ultimately produce the bead, the strip then being passed between a pair of corrugating rollers. Finally, the strip passes between the shaping rollers, which fashion the strip into a cylindrical form, into a rectangular form, or into any other form which it is desired that the can or receptacle shall take.

The foregoing being understood, it is to be recalled that, generally stated, one machine is capable of making one length of can only, and it is one object of this invention to provide novel means whereby a single machine may be adapted to make cans or receptacles of different lengths.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made without departing from the spirit of the invention.

In the accompanying drawings:—

Figure 9:
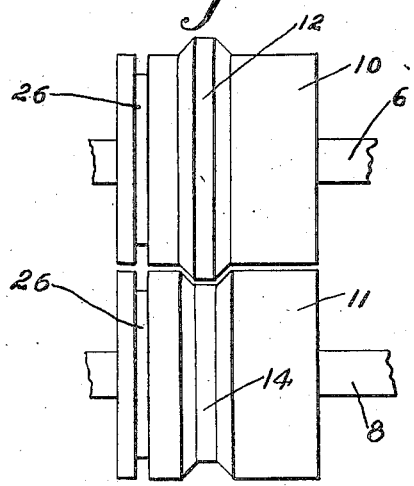
Figure 10:
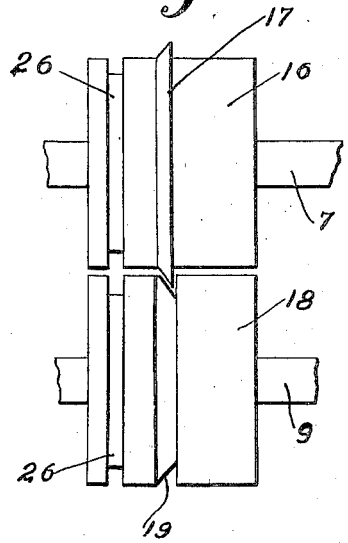
Figure 11:
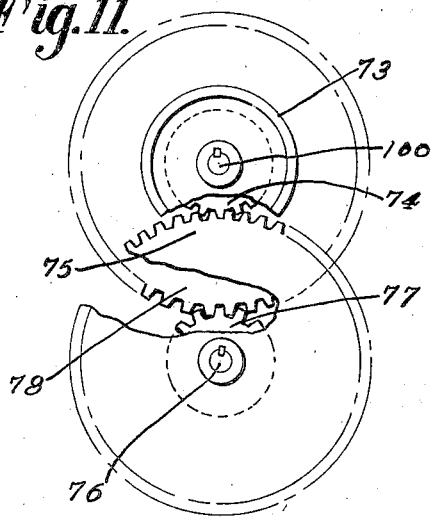

Figure 1 shows in top plan, a machine constructed in accordance with the invention, parts being broken away; Figure 2 is a side elevation wherein parts are broken away; Figure 3 is a fragmental elevation showing the means whereby certain of the rollers are driven; Figure 4 is an elevation showing the means for mounting certain of the shafts; Figure 5 is a section showing the means for adjusting certain of the rollers; Figure 6 is a fragmental longitudinal section showing a portion of one of the corrugating rollers; Figure 7 is a cross section of the element shown in Figure 6; Figure 8 is a perspective view showing one end of the finished product; Figures 9 and 10 are elevations showing the bead-forming rollers; and Figure 11 is a diagrammatic view illustrating certain of the gears.

Referring to Figure 8 of the drawings there is shown a portion of the side wall of a metal receptacle, having longitudinal corrugations 1, the wall being provided at each end with a reversely curved bead 2, there being a plane section 3 between the ends of the corrugations 1 and the beads 2.

The machine forming the subject matter of this application comprises a frame 4 of any desired construction. A shaft 6 is journaled at one end of the frame 4, a shaft 8 being located below the shaft 6 and being journaled in the frame 4. Intermediate the ends of the machine, a shaft 7 is supported for rotation in the frame, a shaft 9 being located below the shaft 7. A roller 10 is carried by the shaft 6, a roller 11 being carried by the shaft 8. The roller 10 has a circumferential rib 12 cooperating with a circumferential groove 14 in the roller 11. The shaft 6 is provided with a roller 15 having a rib 12, the roller 15 cooperating with a roller-like element 11 and mounted on the shaft 8. A roller 16 is carried by the shaft 7 and has a rib 17 coacting with a groove 19 in a roller 18 on the shaft 9. A roller 20 is located on the shaft 7 and is provided with the rib 17, the roller 20 coacting with a roller-like part 18 and mounted on the shaft 9.

There is nothing specifically new in the construction above alluded to, since it is shown in our prior patent hereinbefore mentioned. The description in the present case has been shortened accordingly. Let it suffice to say that the formation of the bead 2 is begun by the rib 12 of the roller 10 and the groove 14 of the roller 11, the formation of the bead being substantially completed by the rib 17 of the roller 16 and the groove 19 of the roller 18.

Referring to Figure 1, and noting the distance between the beads 12 on the rollers 10 and 15, or the distance between the beads 17 on the rollers 16 and 20, it will be clear that, if the machine is to turn out can bodies of different lengths, some means must be provided whereby the rollers 20 and 16, and the rollers 15 and 10 may be shifted toward and away from each other, on their respective shafts. With this end in view, the roller 16 is keyed at 21 to the shaft 7, the roller 10 being keyed to the shaft 6. Obviously, the roller 16 may be shifted, longitudinally of the shaft 7 toward and away from the roller 20, it being possible to shift the roller 10 longitudinally of the shaft 6, toward and away from the roller 15, the roller 11 being keyed to the shaft 8 and the roller 18 being keyed to the shaft 9. When the roller 10 is shifted longitudinally of the shaft 6, the roller 11 will be shifted longitudinally of the shaft 8, because the rib 12 is received in the groove 14. Similarly, when the roller 16 is shifted longitudinally of the shaft 7, the roller 18 will be shifted longitudinally of the shaft 9, because the rib 17 is received in a groove 19. Owing to the foregoing construction, the rollers which form the bead 2 may be moved, so as to enable can bodies of different lengths to be turned out in one machine.

A means is provided whereby the roller 16 may be shifted toward and away from the roller 20 and whereby the roller 10 may be shifted toward and away from the roller 15, as aforesaid. To this end, feed screws 22 are journaled in the frame 4 and extend transversely thereof, the screws being held against longitudinal movement in the frame 4. The feed screws 22 are threaded at 24 into a shifting plate 23, extended longitudinally of the frame. The shifting plate 23 is provided in its ends and in both of its edges, with notches 25, the notches being received in circumferential seats 26 formed in the rollers 10 and 16. If desired, the rollers 11 and 18 may cooperate in a similar way with the shifting plate 23, so that the said rollers may be moved longitudinally of their respective shafts, positively and directly, and independently of the interengagement between the rib 12 and the groove 14, or the interengagement between the rib 17 and the groove 19. On the ends of the feed screws 22 there are beveled pinions 27 meshing into beveled pinions 28 on a shaft 29 extended longitudinally of the frame and supported for rotation thereon, the shaft 29 being actuated in any suitable way, for instance by means of a crank 30, located at one end of the shaft, as shown in Figure 1.

When rotation is imparted to the shaft 29 by means of the crank 30, the beveled pinions 28 and 27 will rotate the feed screws 22, the shifting plate 23 moving inwardly or outwardly on the feed screws, the rollers 16—18 and 10—11 being shifted inwardly or outwardly, so as to vary the distance between the beads 17—17, and 12—12, as and for the purpose hereinbefore stated.

Passing from the rollers 16 and 20, the material traverses a table 31, carried by the frame 4, and moves underneath a retaining roller 32. The table 31 is supplied with longitudinal grooves 33, there being grooves 35 in the retaining roller 32, the grooves 35 coinciding with the grooves 33 in the table 31. Horizontal rollers 34 are mounted for rotation on the table 31 and are disposed adjacent to the grooves 33.

After the bead 2 has been practically completed at the rollers 16 and 20, the bead traverses the grooves 33.

The function of the horizontal rollers 34 is to turn up the bead, finally so that it stands approximately at right angles to the corrugated body portion 1 of the finished article, the corrugations, however, not yet having been made. As the sheet of metal is advanced, the bead 2 is received in the groove 33 of the table 31 and in the groove 35 of the retaining roller 32, the office of the roller 32 being to hold the sheet of metal down on the table 31. A plurality of grooves 33 are formed in the table 31 at that side of the machine where the adjustable roller 16 is located, the corresponding end of the retaining roller 32 having a plurality of the grooves 35. Obviously, when the roller 16 is shifted inwardly, the roller may be made to cooperate with the corresponding ones of the grooves 33 and 35, there being as many or as few as is considered expedient, depending upon the number of different sizes of cans which it is desired to form in one machine.

An upper corrugating roll 36 and a lower corrugating roll 37 are journaled in the frame 4. Since the corrugating rolls 36 and 37 are alike, a description of the roll 36 will suffice, reference being had to Figures 6 and 7. The roll 36 comprises a body 44 having a groove 45 adapted to receive the bead 2 at one end of the sheet. The body 44 has longitudinal ribs 46 which serve to put the corrugations 1 into the product. The roll 36 comprises a neck 47 about which fits a ring 48 having ribs 49, alined with the ribs 46 of the body 44. The ring 48 abuts against one end of the body 46. A removable section is provided, the same comprising semicircular parts 50 held by screws 51 on the neck 47, the parts 50 having ribs 52, alined with the ribs 49 and 46. The parts 50 are provided with a circumscribing groove 53 adapted to receive the bead 2 of the product. Outwardly of the members 50—50, a ring 54 is located. The ring 54 is supplied with ribs 55. An abutment 56 is mounted on the neck 47 and is held by a set screw 57, or in any other suitable way. The neck 47 and parts carried thereby may be provided with cooperating slots 58, so that the said parts and the neck may be keyed in place, if desired.

The elements 50 may be removed from the neck 47 of the corrugating roll 36, and then the ring 54 may be pushed up against the ring 48, the parts 50 being mounted again on the neck, outwardly of the ring 54, after the ring 54 has been advanced up against the ring 48. Obviously, this construction enables the corrugating roll to be lengthened or shortened at will, corresponding to the movement produced between the rolls 16 and 20. There may be as many of the rings 54 as desired.

By the time that the product has passed the corrugating rolls 36 and 37, the corrugations 1 have been formed, and the beads 2 have been completed. It remains, merely to curve the sheet, or to shape the sheet otherwise, so that its ends are brought together to form the side wall of the receptacle. The mechanism for accomplishing this result will now be described.

In the sides of the frame 4, openings 38 are fashioned. In each opening 38 there is located a U-shaped frame 39, in the lower end of which a bearing 40 is secured. A bearing 41 is adjustable in the frame 39, the numeral 42 designating an adjusting device for the bearing 41, such as a screw threaded into the top of the frame 39. A rod 59 is journaled in the frame 4. Eccentrics 60 are secured to the rod 59, externally of the frame, one eccentric being provided with a handle 62. Straps 61 surround the eccentrics 60 and are located at the lower ends of arms 63, bearings 64 being rotatable in the upper ends of the arms, each bearing 64 having a flange 65 overlapping the outer surface of the corresponding arm and provided with seats 66 adapted to receive a spanner wrench, the construction being such that the bearing 64 may be rotated for adjustment. Set screws 67, threaded into the arms 63, constitute means for holding the bearings in adjusted positions. A shaft 68 is journaled in the bearings 64 and is journaled in the bearings 41 as hereinbefore alluded to. The shaft 68 carries an upper shaping roll 69, a lower shaping roll 70 being journaled in the bearings 40. At one end, the rolls 69 and 70 are provided with a single circumferential groove 71, the rolls being provided at their other ends with a plurality of grooves 72, the grooves 71 and 72 being adapted to receive the bead 2 of the product.

When the eccentrics 60 are rocked by means of the handle 62, the arms 63 will be raised and lowered, the shaping rolls 69 and 70 being raised and lowered accordingly. Further, by rotating the bearings 64 in the upper ends of the arms 63, the shaft 68 and the upper shaping roll 69 may be shifted with respect to the lower shaping roll 70, the elements 42 of Figure 4 constituting means for holding the bearing 41 and the upper shaping roll 69 in any position to which they may have been adjusted by rotation of the bearings 64, it being observed that the shaft 68 is located eccentrically in the bearings 64.

The operation of the machine has been dealt with hereinbefore step by step, in connection with the various component mechanisms, but a brief résumé will be given at this point.

The rollers 10 and 16 may be shifted toward and away from the rollers 15 and 20 by a manipulation of the crank 30, the distance between the beads 2 being regulated accordingly. The corrugating rolls 36 and 37 may be adjusted in length by shifting the ring 54 relatively to the ring 48. Since the shaping rollers 69 and 70 have a plurality of grooves 72 and since the grooves 33 in the table, and the grooves 35 in the retaining roller 32 are duplicated, the bead 2 will be taken care of, when the machine is adjusted to change the distance between the beads in the finished product.

Any suitable means may be provided for driving the rotatable parts in the machine. A pulley 73 may be mounted to rotate on a shaft 100 journaled in the frame work of the machine, a pinion 74 being mounted to turn with the pulley 73. The pinion 74 meshes into a gear wheel 75 carried by a shaft 76 journaled in the frame of the machine. The shaft 76 carries a pinion 77 meshing into a gear wheel 78 fixed to the shaft 100. The parts above alluded to are located at one side of the machine. At the other side of the machine, there is a gear wheel 79 on the shaft 100, the gear wheel 79 meshing into a gear wheel 80 on the lower corrugating roll 37, the gear wheel 80 meshing into a gear wheel 81 on the upper corrugating roll 36. The foregoing elements constitute a reducing train for driving the corrugating rolls 36 and 37. Beveled pinions 82 connect the shaft 100 with a shaft 83 extended longitudinally of the frame and journaled thereon. Beveled pinions 84 connect the shaft 83 with the shafts 8 and 9, motion being transmitted from the shafts 8 and 9 to the shafts 6 and 7 by intermeshing gear wheels 85. (Fig. 3.)

What is claimed is:—

1. In a device of the class described, bead-forming rolls; means for shifting one roll toward and away from the other, said means comprising a member wherein the shiftable bead-forming roll is journaled, and a feed screw threaded into said member; and a corrugating roll comprising an adjustable section constituting means for varying the length of the corrugating roll to correspond with the position of the shiftable bead-forming roll.

2. In a device of the class described, a frame; bead-forming rolls journaled on the frame and each comprising sections, one of which is movable and adjustable toward and away from the other; a table on the frame and provided with a plurality of grooves to receive the bead when the movable sections of the bead-forming rolls are adjusted; a retainer above the table and grooved to correspond therewith; corrugating rolls receiving the material from the table, each corrugating roll comprising intermediate and end sections, the rolls having longitudinal ribs which terminate in the end sections, and the intermediate section being shiftable inwardly and outwardly of the end section to vary the length of the corrugating roll; a shaping roll grooved to correspond with the table; and means for adjusting the shaping roll in a direction substantially parallel to a plane passing through the axes of rotation of the corrugating rolls.

In testimony that we claim the foregoing as our own, we have hereto affixed our signatures in the presence of two witnesses.

GEORGE A. TRACHTE.
ARTHUR F. TRACHTE.

Witnesses:
LAURENCE WALTHER,
J. J. MCMANAMY.